United States Patent [19]
Kangas et al.

[11] Patent Number: 5,975,025
[45] Date of Patent: Nov. 2, 1999

[54] SYSTEM FOR THERMAL CONTROL OF OUTDOOR PET ENCLOSURE

[76] Inventors: Robert E. Kangas; Jill S. Kangas, both of 4701 W. Escuda Dr., Glendale, Ariz. 85308

[21] Appl. No.: 09/009,200

[22] Filed: Jan. 20, 1998

[51] Int. Cl.⁶ ........................................................ A01K 1/00
[52] U.S. Cl. ............................................ 119/484; 119/500
[58] Field of Search ................................. 119/165, 484, 119/486, 448, 500; 454/344

[56] References Cited

U.S. PATENT DOCUMENTS

| | | | |
|---|---|---|---|
| 2,638,836 | 5/1953 | Hull | 454/344 |
| 4,504,011 | 3/1985 | Farrell | 119/448 X |
| 5,655,478 | 8/1997 | Kiera | 119/165 |
| 5,809,936 | 9/1998 | Wall | 119/484 |

*Primary Examiner*—Robert P. Swiatek
*Attorney, Agent, or Firm*—Martin L. Stoneman

[57] ABSTRACT

A system for transferring ambient air from an interior of a house to a pet enclosure external of the house, thus allowing for the pet enclosure to receive cooled or heated air approximating the temperature of the house. An electric fan housed in a preformed enclosure is installable in, or on, the house exterior wall. An air conduit between the fan and pet enclosure is preferably provided by a flexible rubber transfer duct which may vary in length. Conduit connections at the house and at the pet enclosure use a gasket/flange sealing system. A damper to avoid backflow of air is provided near the fan. And a protective cover at the pet enclosure limits access from the pet enclosure to the conduit. An end cap to protect the house when the duct is not in use is also shown.

21 Claims, 4 Drawing Sheets

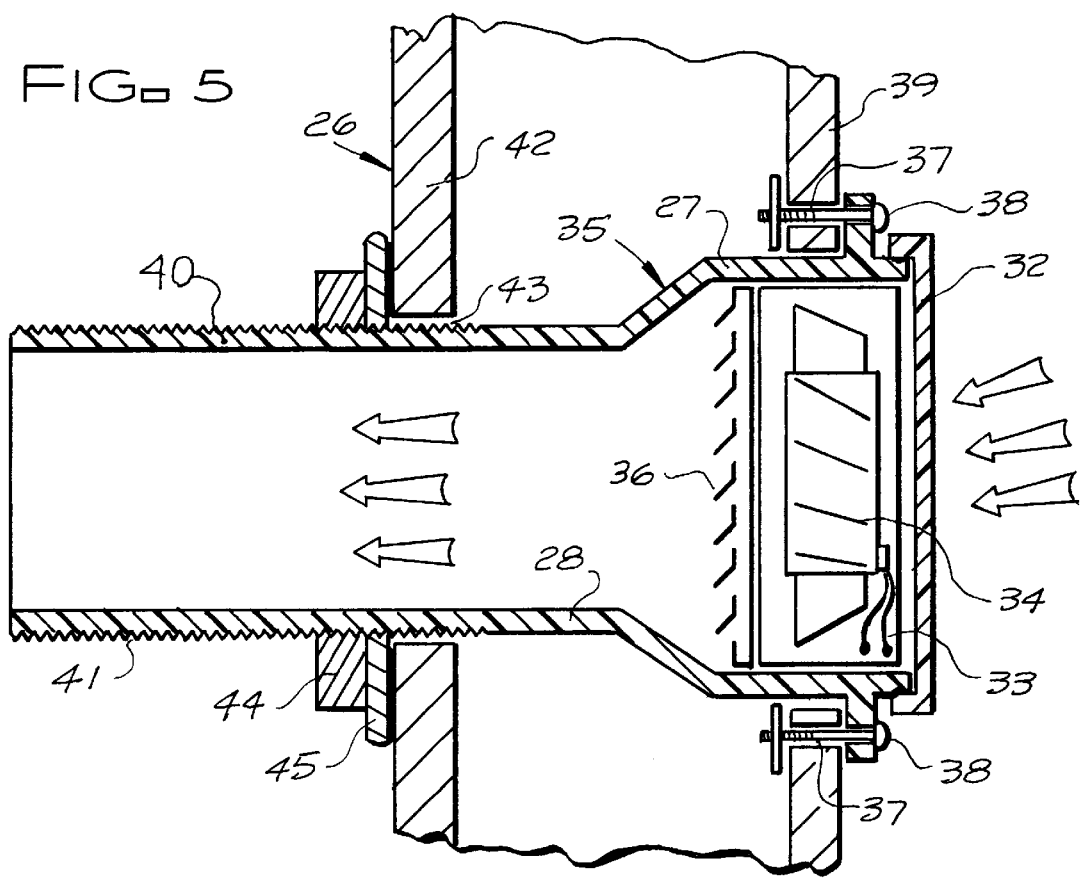
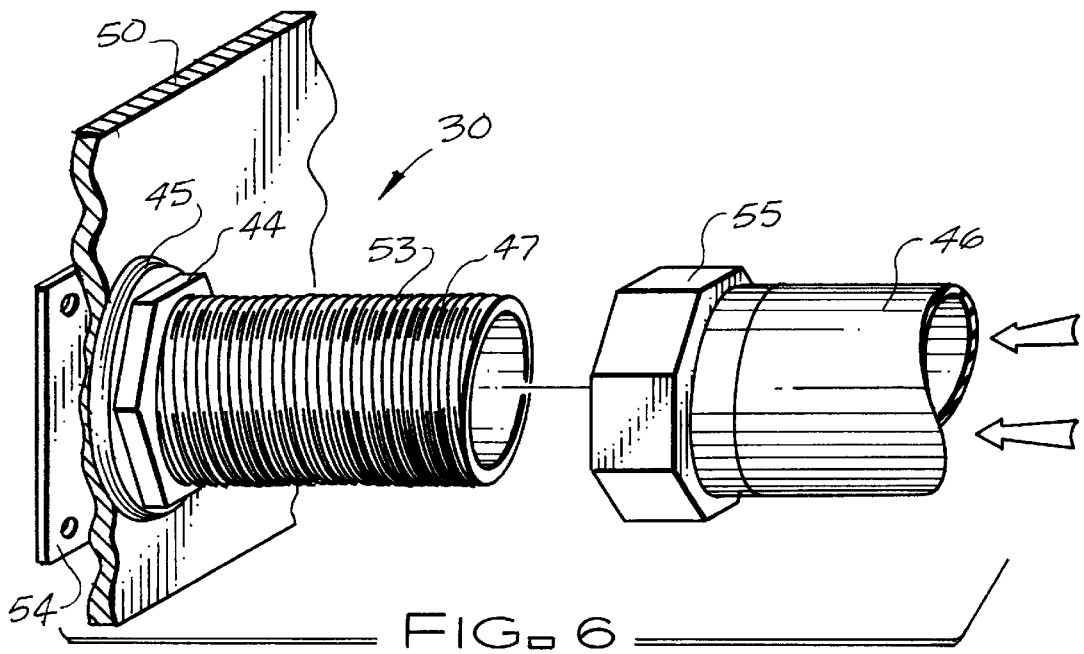

SYSTEM FOR THERMAL CONTROL OF OUTDOOR PET ENCLOSURE

BACKGROUND OF THE INVENTION

1. Field of the Invention

This invention relates to providing a system for thermal control of an outdoor pet enclosure. More particularly, this invention concerns a system for transferring ambient air from a house to an external pet enclosure.

2. Description of the Prior Art

Typically, in those households that have pets, the pet owners may prefer the pet to remain outside or to remain outside the house during certain times of the day, such as night time. In these cases, pet owners often provide the pet with some type of enclosure into which the pet may enter at will. For those pets that are not naturally equipped to handle extreme weather conditions such as very high or low temperatures, the pet owners must either shave the pet if the temperature is very warm and the pet has an abundance of fur, or provide some type of garment for the pet if the temperature is low and the pet lacks sufficient fur. In those cases where the pet owners fails to provide the above-mentioned aids, the pet must endure the adverse weather conditions with a possible result that the pet will suffer sickness or even death.

Thus, pet owners who have outside pet enclosures for pets who normally live outside the house, as for "outside" dogs and the like, must be careful of injury to such pets from extreme summer heat or from extreme winter cold. Even if such pet owners look into existing means for thermal control of such pet enclosures, such pet owners are typically faced with expensive and/or cumbersome devices, such as air conditioning units or heating units expressly designed for pet enclosures. Further, even such expensive and/or cumbersome systems may expose the pet to danger or hot or moving parts—or may expose the thermal devices to harm from the action of the pet.

In order to overcome these difficulties, the prior art has disclosed various means by which pet owners may attempt to maintain a comfortable environment for the pet. For example, U.S. Pat. No. 4,827,872 issued to William R. Sommers discloses an outside animal shelter in which an inner cavity of the shelter is equipped with an electric heating unit and temperature sensing controllers. But systems such as that one are impracticable and expensive for many pet owners, require outside electricity, which may be inefficient, and deal with only either heat or chill, but not both, etc.

Thus it would be a boon to owners of "outside" pets having outside pet enclosures, especially in very warm summer or very cold winter locations, to be able to have a low-cost and efficient system for thermal control, heating or cooling, of pet enclosures which system is not harmful to the pet or exposed to harm from the pet.

OBJECTS OF THE INVENTION

A primary object of the present invention is to fulfill the above-mentioned needs by the provision of a system for transferring ambient air from a house to an external pet enclosure. A further primary object of the present invention is to provide such a system which is efficient, inexpensive, and easy to use. Other objects of this invention will become apparent with reference to the following invention descriptions.

SUMMARY OF THE INVENTION

According to a preferred embodiment of the present invention, this invention provides a system for transferring ambient air from an interior of a house to a pet enclosure external of such house, comprising: an air forcing means for forcing ambient air from the interior of the house into the pet enclosure; conduit means for channeling such ambient air from such interior of such house into such pet enclosure; first attachment means for attaching such air forcing means to such house; second attachment means for attaching such conduit means to such air forcing means; and third attachment means for attaching such conduit means to such pet enclosure. It also provides such a system wherein such conduit means comprises a round cylindrical duct; and, further, wherein such round cylindrical duct comprises a flexible rubber material.

Further, this invention provides such a system wherein such air forcing means and first attachment means are structured and arranged for mounting to an external wall of such house; and, further, wherein such air forcing means comprises an electrically powered fan; and, further, wherein such electrically powered fan and first attachment means are structured and arranged for mounting on an interior portion of such external wall of such house; and, further, wherein such electrically powered fan is housed in a cylindrical housing. And it also provides such a system further comprising a cover means for such fan for acting as a protective grill. It moreover provides such a system further comprising a protective means for limiting access to such conduit means from such pet enclosure. In addition, this invention provides such a system further comprising a closable damping means in such conduit means for limiting air backflow from such pet enclosure to such house; and, also, further comprising a first sealing means for preventing flow of air into or out of such house around such conduit means; and, also, further comprising a second sealing means for preventing flow of air into or out of such pet enclosure around such conduit means.

Additionally, in accordance with a preferred embodiment thereof, this invention provides a system for transferring ambient air from an interior of a house to a pet enclosure external of such house, comprising: an air forcing means for forcing ambient air from such interior of such house into such pet enclosure; a conduit means for channeling such ambient air from such interior of such house into such pet enclosure; and such air forcing means being mounted to an interior side of an external wall of such house. It also provides such a system wherein such air forcing means comprises an electrically powered fan, and such electrically powered fan is housed in a cylindrical housing.

Moreover, it provides such a system wherein such conduit means includes a conduit portion of such cylindrical housing, and such cylindrical housing includes, located to an input side of such fan, a substantially square-cylindrical first portion, and, located to an output side of such fan, a substantially round-cylindrical second portion comprising such conduit portion. And it provides such a system wherein such conduit means between such round-cylindrical second portion and such pet enclosure comprises a round cylindrical duct; and, further, wherein such round cylindrical duct is mechanically attached with such pet enclosure; and, further, wherein at least a portion of such electrically powered fan is located within such external wall of such house.

Even further, in accordance with a preferred embodiment thereof, this invention provides a system for transferring ambient air from an interior of a house to a pet enclosure external of such house, comprising: a house having a first external wall; a pet enclosure having a second external wall; a housing having an integral fan and attached to such first external wall, such housing comprising a substantially square-cylindrical first end, a substantially round-cylindrical second end, and such substantially round-cylindrical second end comprising first external threads; a duct attachment device for such pet enclosure, having a first attachment end and a second attachment end, such second attachment end comprising second external threads; a cylindrical duct having a first duct end and a second duct end, wherein such second duct end is structured and arranged for threaded attachment by first internal threads to such second external threads of such second attachment end, and such first duct end is structured and arranged for threaded attachment by second internal threads to such first external threads of such substantially round-cylindrical second end of such housing; a first flange nut, having third internal threads for engagement with such first external threads; a first sealing gasket located between such first flange nut and such first external wall; a second flange nut, having fourth internal threads for engagement with such second external threads; and a second sealing gasket located between such second flange nut and such second external wall.

This invention further provides such a system further comprising: attached within such housing, a closable damping means for limiting air backflow from such pet enclosure to such house; attached to such second external wall, a protective means for limiting access to such cylindrical duct from such pet enclosure; attached to such substantially square-cylindrical first end of such housing, a substantially square fan cover; and a cap, having fifth internal threads for engagement with such first external threads, for sealing such substantially round cylindrical second end when such pet enclosure is not in use.

BRIEF DESCRIPTION OF THE DRAWINGS

FIG. 5 is a sectional view of the embodiment of FIG. 4 taken along the section 5—5 of FIG. 4.

FIG. 6 is a perspective view of a preferred embodiment of the pet enclosure portion of the system of the present invention.

DETAILED DESCRIPTION OF A PREFERRED EMBODIMENT AND THE BEST MODE OF PRACTICE

Figure 1:
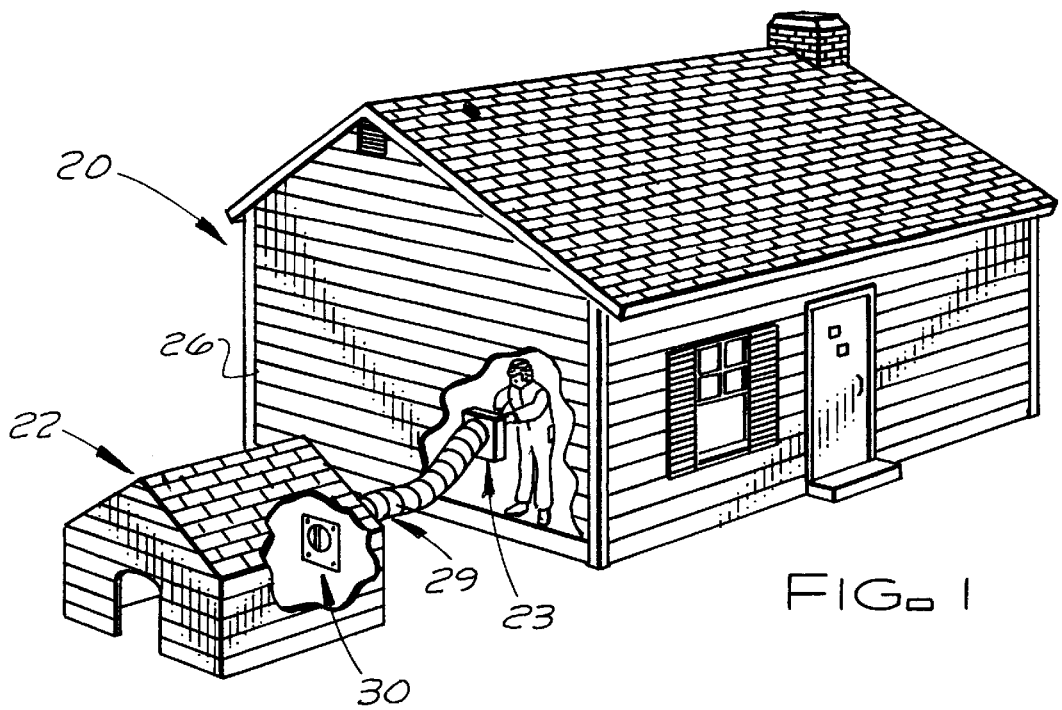
FIG. 1 is a perspective view of a house and pet enclosure with a preferred embodiment of the present invention shown installed.

Referring to the drawings, FIG. 1 shows a perspective view of a preferred embodiment of the present invention, a system for transferring ambient air from a house to an external pet enclosure. This system is installed at and between the house 20 and the pet enclosure 22. Shown is: the house installation 23 part of this invention, which part includes the air forcing means of the present invention, installed in house exterior wall 26; a conduit means 29 extending generally from the house 20 to the pet enclosure 22 (embodying herein a conduit means for channeling such ambient air from such interior of such house into such pet enclosure); and the pet-enclosure installation 30 part of this invention.

Figure 2:
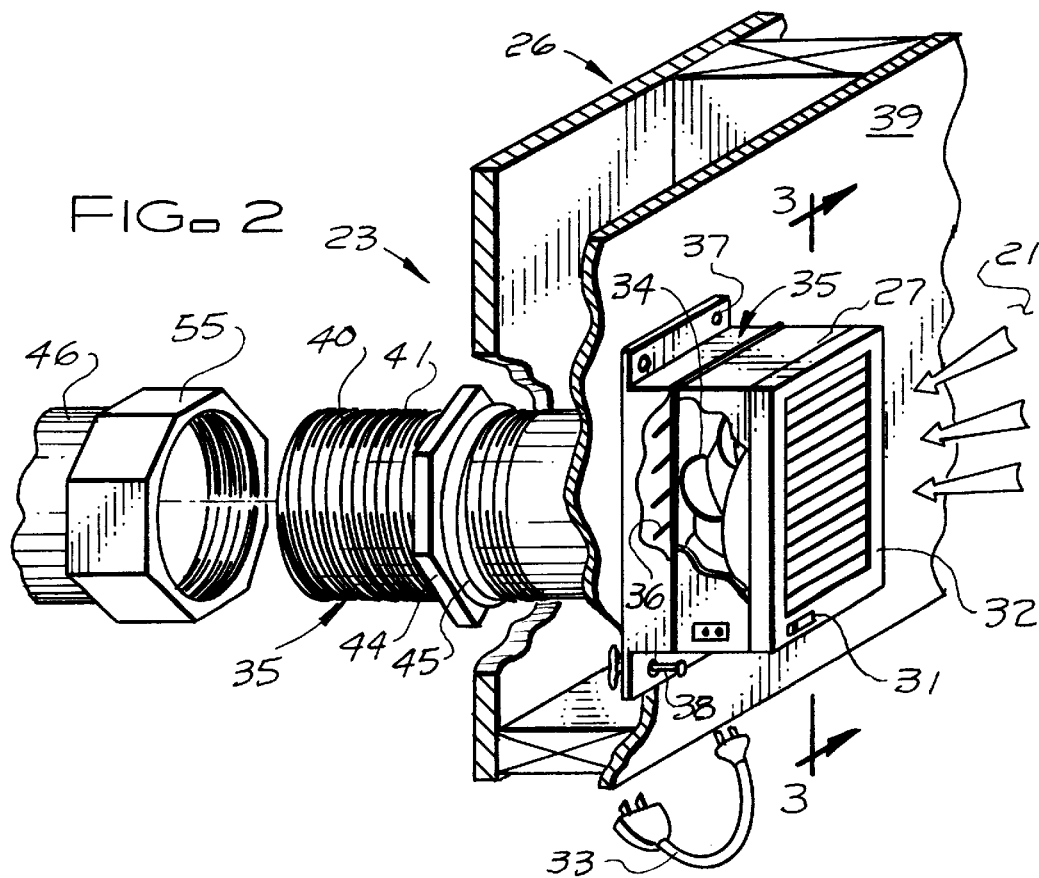
FIG. 2 is a perspective view of a preferred embodiment of the house portion of the system of the present invention.
Figure 3:
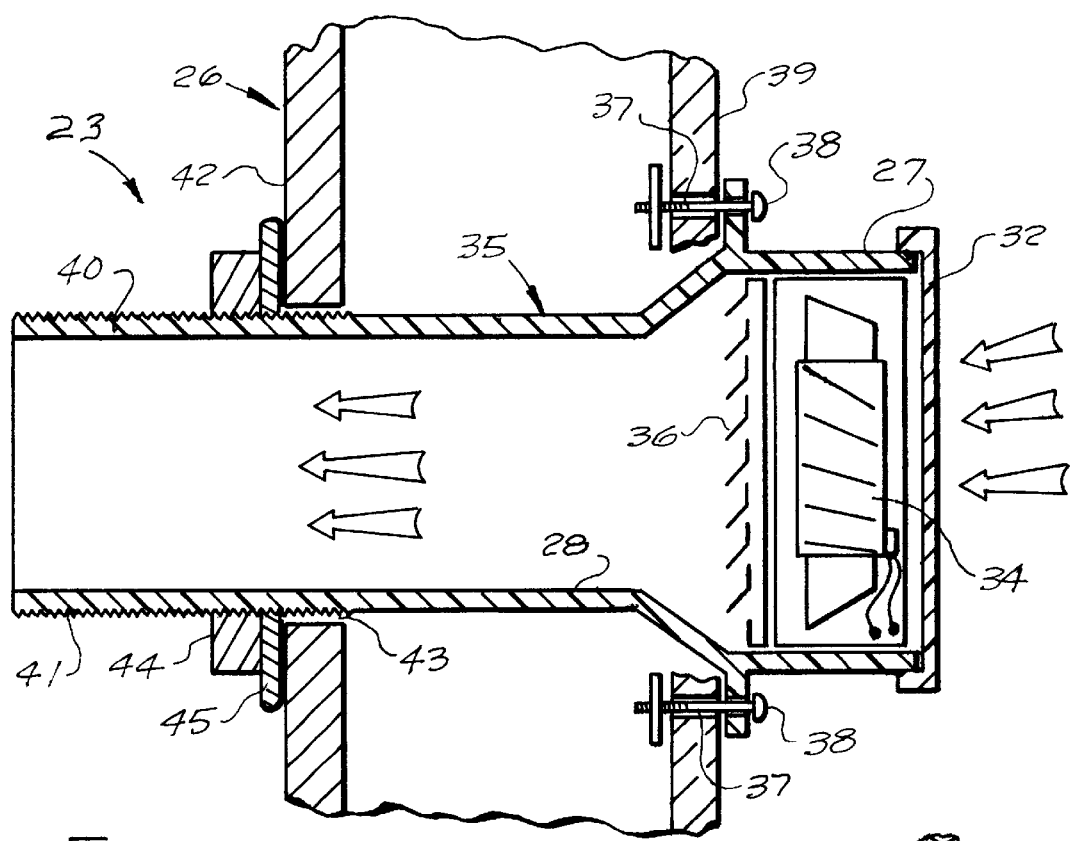
FIG. 3 is a sectional view of the embodiment of FIG. 2 taken along the section 3—3 of FIG. 2.

FIG. 2 is a perspective view of a preferred embodiment of the house portion of the system of the present invention and showing the house installation 23 at the house exterior wall 26. FIG. 3 is a sectional view of the embodiment of FIG. 2 taken along the section 3—3 of FIG. 2. As illustrated in FIG. 2 and FIG. 3, the present invention draws in ambient air (see flow arrows) at room temperature from the inside 21 of house 20 by means of a fan 34, preferably a 115 v-AC single phase electric fan, having (as shown) a substantially cylindrical fan housing 35, preferably an integral preformed plastic housing. Fan 34 embodies herein the air forcing means of this invention for forcing ambient air from the interior 21 of the house 20 into the pet enclosure 22. The preferred embodiment of fan 34 is a NMB model 4715FS-12T-B30 fan manufactured by MINEBEA CO. LTD., made in Thailand. (The fan measures approximately 411/16" wide by 411/16" high by 1½" deep.)

The preformed plastic fan housing 35 illustrated preferably has preformed mounting holes 37 to provide a means for mounting fan 34 to the interior side 39 of exterior wall 26. The preformed mounting holes 37 in the fan housing 35 allow for a mounting screw 38 to pass through the fan housing 35 and mount into the interior side 39, preferably to a wood or metal stud or into an appropriate type anchor for the type of interior wall present. This attachment system embodies herein first attachment means for attaching such air forcing means to such house. As illustrated, cylindrical fan housing 35 preferably includes a substantially-square first portion 27 located to the input side of fan 34 and a substantially-round second portion 28 located to the output side of fan 34 (which includes a conduit portion 40). This arrangement embodies herein such conduit means including a conduit portion of such cylindrical housing, and such cylindrical housing including, located to an input side of such fan, a substantially square-cylindrical first portion, and, located to an output side of such fan, a substantially round-cylindrical second portion comprising such conduit portion.

In operation, activation of the electric fan 34 through the use of the fan power switch 31 causes ambient air from the inside of house 20 to be drawn through a cover 32, which acts as a protective grill (embodying herein a cover means for such fan for acting as a protective grill and attached to such substantially square-cylindrical first end of such housing as a substantially square fan cover) attached to the substantially-square end of fan housing 35. Such ambient air then (see FIG. 1) passes through conduit means 29 and into pet enclosure 22 by way of pet enclosure installation portion 30.

Thus (with reference to FIGS. 2 and 3) such ambient air is forcibly blown through a one-way internal damper 36 which is utilized to prevent the backflow of outside air into the house when the fan is turned off. Preferably, the damper 36 is constructed and arranged (in well-known ways, using gravity and air-flow pressure) to automatically open upon application of air pressure caused by the running fan 34 and to automatically close when the fan 34 is turned off, damper 36 embodying herein a closable damping means in such conduit means for limiting air backflow from such pet enclosure to such house. This blown ambient air (see flow arrows), after passing through damper 36, goes through conduit portion 40 of fan housing 35 (which passes through the exterior side 42 of house exterior wall 26) and then through a transfer duct 46, preferably made of a flexible rubber, which is mechanically attached (preferably by an internally-threaded coupler 55, as shown) to conduit portion 40, this arrangement embodying herein a second attachment means for attaching such conduit means to such air forcing means. Then such flowing ambient air (as shown in FIG. 6) passes into the pet enclosure 22 by way of pet enclosure installation portion 30.

Thermal sealing of the house exterior wall 26 (by sealing off air flow around conduit portion 40) is accomplished by means of a sealing gasket 45 pressure fitted against the exterior side 42 of house exterior wall 26 by a duct flange nut 44 threaded internally that fits over an externally-threaded portion 41 of conduit portion 40 (as shown) that is a part of the preformed plastic fan housing 35. Externally-threaded portion 41, as shown in the drawings, embodies herein such substantially round-cylindrical second end comprising first external threads. The duct flange nut 44 (embodying herein a first flange nut, having internal threads for engagement with such first external threads) is tightened against the sealing gasket 45 firmly, spreading the sealing gasket 45 (embodying herein a first sealing gasket located between such first flange nut and such first external wall) over and around the opening 43 in the exterior side 42 of house exterior wall 26, the described arrangement embodying herein a first sealing means for preventing flow of air into or out of such house around such conduit means.

FIG. 6 shows a similar means used to seal the opening at the pet enclosure 22. A separate preformed plastic attachment duct 47 is installed through a pet enclosure wall 50. Here, for pet enclosure installation 30, a similar (to house installation 23) sealing gasket 45 and duct flange nut 44 (embodying herein a second flange nut, having internal threads for engagement with such second external threads, and a second sealing gasket located between such second flange nut and such second external wall) are mounted on the exterior of a preformed plastic attachment duct 47 acting in a similar way to conduit portion 40 as described above, embodying herein a second sealing means for preventing flow of air into or out of such pet enclosure around such conduit means. External threads 53 (see FIG. 6) and attachment duct 47 embody herein a duct attachment device for such pet enclosure, having a first attachment end and a second attachment end, such second attachment end comprising second external threads.

Figure 7:
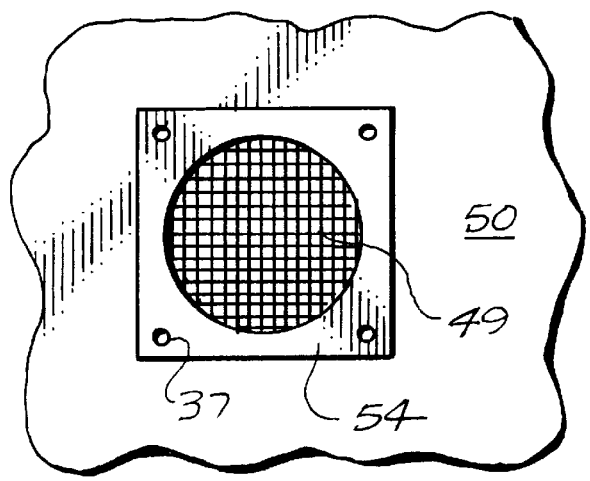
FIG. 7 is an elevation view showing the attachment of the pet enclosure protective cover to the inside of the pet enclosure wall.

Attachment duct 47 is installed in well known ways in a hole through the pet enclosure wall 50. FIG. 7 shows a wire screen 49 installed on the portion of the attachment duct 47 that protrudes through the pet enclosure wall 50 into the interior of the pet enclosure 22, wire screen 49 serving as a protective means for limiting access to such conduit means from such pet enclosure. The wire screen 49 is preferably installed in a plastic frame 54 mounted over and being an integral part of such protruding end of the attachment duct 47. The attachment duct 47 preferably has preformed mounting holes 37 in it (as shown in FIG. 7) and installation with the proper screw/mounting hardware prevents the attachment duct 47 from being pulled out of the pet enclosure wall 50. Having now installed duct attachments at the house 20 and pet enclosure 22, the two are connected by means of a flexible rubber transfer duct 46 (shown in FIGS. 2 through 6), embodying herein, together with the duct attachments at both ends, conduit means comprising a round cylindrical duct.

This flexible rubber transfer duct 46 is preferably attached to the end of the preformed plastic conduit portion 40 by means of a pipe coupler 55 (see FIG. 9), constructed in well known ways, which has a substantially round first end 56, a flanged second end 57, and an internally threaded nut portion 58. Coupling of transfer duct 46 to the preformed plastic conduit portion 40 is accomplished by sliding an end of transfer duct 46 onto the substantially round first end 56 of the pipe coupler 55 thereby forming a tight friction fit. The flanged second end 57 of the pipe coupler 55 is placed against the end of the conduit portion 40 and the internal threads on the internally threaded nut portion 58 are engaged with the external threads on the externally threaded portion 41 of conduit portion 40 thereby forming a tight mechanical connection. Likewise, the attachment of transfer duct 46 to attachment duct 47 is accomplished by the use of the same type of pipe coupler 55 and in the same manner as described above. This arrangement embodies herein a third attachment means for attaching such conduit means to such pet enclosure, and further, embodies such round cylindrical duct being mechanically attached with such pet enclosure, and further, embodies herein a cylindrical duct having a first duct end and a second duct end, wherein such second duct end is structured and arranged for mechanical (preferably threaded, as shown) attachment to such second attachment end, and such first duct end is structured and arranged for mechanical (preferably threaded, as shown) attachment to such substantially round-cylindrical second end of such housing. Though applicant has described the preferred method for the second and third attachment means, other attachment methods, such as direct slidable attachment of the transfer duct 46 ends to the conduit portion 40 and attachment duct 47, may be used where cost or other considerations dictate.

The fan power connection 33 for the preferred embodiment of FIGS. 2 and 3 is by means of a power cord connection at the preformed plastic fan housing 35. A specialty power cord connects to the house electric power supply by plugging into a house 20 electrical outlet, and into the preformed plastic fan housing 35 fan power connection 33.

Figure 4:
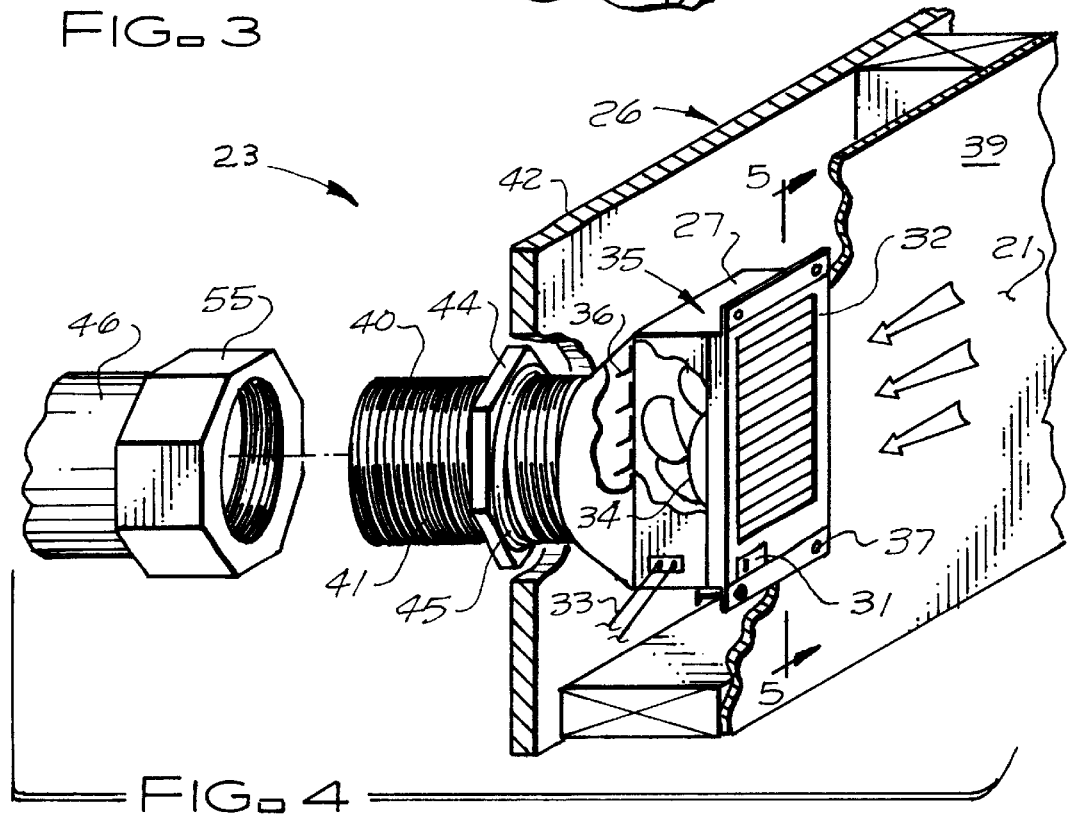
FIG. 4 is a perspective view of another preferred embodiment of the house portion of the system of the present invention.

FIG. 4 is a perspective view of an alternate preferred embodiment of the present invention. FIG. 5 is a sectional view of such alternate preferred embodiment taken along the section 5-5 of FIG. 4. As shown in FIGS. 4 and 5, the fan 34 draws in ambient air from the inside 21 of house 20. The fan 34 is enclosed in a preformed plastic fan housing 35 with an integral conduit portion 40. As in the embodiment of FIGS. 2 and 3, the air is drawn through a protective cover 32 attached as a grill over the preformed plastic fan housing 35, which includes an electric fan power switch 31. In the alternate preferred embodiment of FIGS. 4 and 5, as shown, the fan 34 is partially located within house exterior wall 26 and thus partially located in between the interior side 39 and the exterior side 42 of house exterior wall 26, embodying herein that at least a portion of such electrically powered fan being located within such external wall of such house. The operation and air flow in this alternate embodiment is the same as for the embodiment of FIGS. 2 and 3.

The preformed plastic fan housing 35 shown in FIG. 4 and FIG. 5 preferably has preformed mounting holes 37 to provide a means for mounting the present invention to the interior house wall 39. The preformed mounting holes 37 are mounted toward the front of the plastic fan housing 35 to allow for the majority of the inner end of the preformed plastic fan housing 35 to be hidden in the wall space between the house interior wall 39 and house exterior wall 42. Preferably, a mounting screw 38 is inserted through the plastic fan housing 35 mounting holes 37 and installed into the house interior wall 39 by direct means to a wood or metal stud or into an appropriate type anchor for the type of interior wall present. As discussed previously, the use of an internal damper 36 as previously detailed prevents the exterior air from the pet enclosure from entering the interior of the house 20 when the internal fan 34 is not operating.

As in the first preferred embodiment, the alternate embodiment also incorporates thermal sealing. Here also, thermal sealing of the house exterior wall 26 (by sealing off air flow around conduit portion 40) is accomplished by means of a sealing gasket 45 pressure fitted against the exterior side 42 of house exterior wall 26 by a duct flange nut 44 threaded internally that fits over an externally-threaded portion 41 of conduit portion 40 (as shown) that is a part of the preformed plastic fan housing 35. The duct flange nut 44 is tightened against the sealing gasket 45 firmly, spreading the sealing gasket 45 over and around the opening 43 in the exterior side 42 of house exterior wall 26. The thermal sealing of the pet enclosure remains unchanged in using the alternate preferred embodiment. Also, the use of the flexible rubber transfer duct 46 is the same for both illustrated embodiments, as shown.

The fan power connection 33 for the alternate preferred embodiment is by the means of a wiring connection between the house electrical system and the power cord connection at the preformed plastic fan housing 35. This connection is an "in the wall connection" as shown in FIG. 4. In the alternate preferred embodiment, electrical power is drawn from the nearest outlet wiring (having established that the power requirements of the fan do not exceed any established electrical code requirements for the circuit or wiring) using the appropriate wiring and connections in well-known ways.

Figure 8:
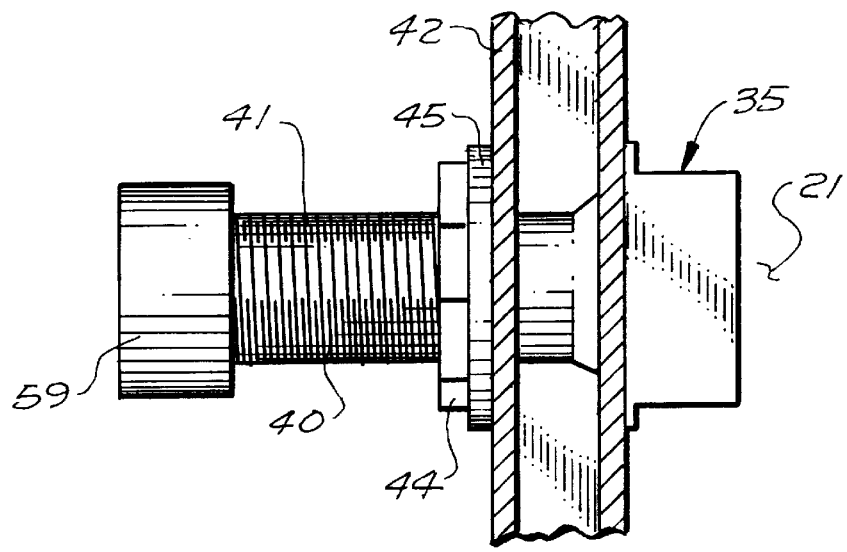
FIG. 8 is a left side elevation view of the house portion illustrating the use of a cap when the pet enclosure is not in use.
Figure 9:
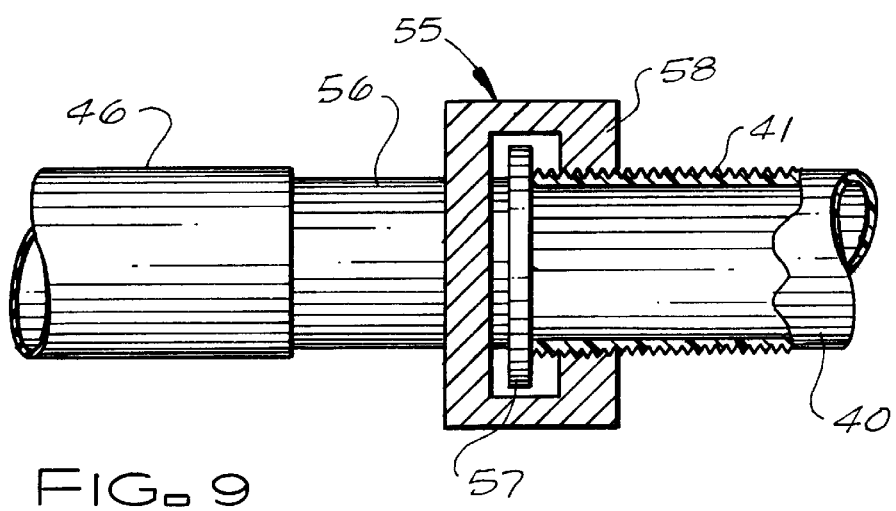
FIG. 9 is an elevation view, partially in section, illustrating the coupler used in the present invention.

FIG. 8 is a left side elevation view of the house portion of the present invention, showing the end cap detail. Specifically illustrated is the use of a cap 59, which is used to prevent access to the interior 21 of the house 20 by insects, birds, or rodents when the pet enclosure 22 is no longer in use. Cap 59, constructed in well known ways, has internal threads for engaging the threads on the external threaded portion 41 of the preformed plastic fan housing 35 conduit portion 40. FIG. 9 illustrates the coupler area detail, previously herein discussed.

Although applicant has described applicant's preferred embodiments of this invention, it will be understood that the broadest scope of this invention includes such modifications as diverse shapes and sizes and materials. Such scope is limited only by the below claims as read in connection with the above specification. Further, many other advantages of applicant's invention will be apparent to those skilled in the art from the above descriptions and the below claims.

What is claimed is:

1. A system for transferring ambient air from an interior of a house to a pet enclosure located externally of said house, comprising;
   a. a house having an interior and having an external wall;
   b. a pet enclosure located externally to said house, said pet enclosure being essentially located above ground level;
   c. an air forcing means, structured and arranged for location substantially within said interior of said house, for forcing ambient air from said interior of said house into said pet enclosure;
   d. conduit means for channeling said ambient air from said interior of said house into said pet enclosure;
   e. first attachment means for attaching said air forcing means to said house;
   f. second attachment means for attaching said conduit means to said air forcing means; and
   g. third attachment means for attaching said conduit means to said pet enclosure.

2. A system for transferring ambient air from a house to an external pet enclosure according to claim 1, wherein said conduit means comprises a round cylindrical duct.

3. A system for transferring ambient air from a house to an external pet enclosure according to claim 1, wherein said air forcing means and first attachment means are structured and arranged for mounting to an external wall of said house.

4. A system for transferring ambient air from a house to an external pet enclosure according to claim 3, wherein said air forcing means comprises an electrically powered fan.

5. A system for transferring ambient air from a house to an external pet enclosure according to claim 4, wherein said electrically powered fan and first attachment means are structured and arranged for mounting on an interior portion of said external wall of said house.

6. A system for transferring ambient air from a house to an external pet enclosure according to claim 5, wherein said electrically powered fan is housed in a cylindrical housing.

7. A system for transferring ambient air from a house to an external pet enclosure according to claim 1 further comprising a protective means, structured and arranged for attachment adjacent said pet enclosure, for limiting access to said conduit means from said pet enclosure.

8. A system for transferring ambient air from a house to an external pet enclosure according to claim 1 further comprising a first sealing means for preventing flow of air into or out of said house around said conduit means.

9. A system for transferring ambient air from a house to an external pet enclosure according to claim 8 further comprising a second sealing means for preventing flow of air into or out of said pet enclosure around said conduit means.

10. A system for transferring ambient air from an interior of a house to a pet enclosure external of said house, comprising;
    a. a house having an interior and having an external wall;
    b. a pet enclosure located externally to said house, said pet enclosure being essentially located above ground level;
    c. an air forcing means for forcing ambient air from said interior of said house into said pet enclosure;
    d. a conduit means for channeling said ambient air from said interior of said house into said pet enclosure; and
    e. said air forcing means being structured and arranged for mounting to an interior side of said external wall of said house.

11. A system for transferring ambient air from a house to an external pet enclosure according to claim 10, wherein:
    a. said air forcing means comprises an electrically powered fan; and
    b. said electrically powered fan is housed in a cylindrical housing.

12. A system for transferring ambient air from an interior of a house to a pet enclosure external of said house, comprising:
    a. an air forcing means for forcing ambient air from said interior of said house into said pet enclosure;
    b. a conduit means for channeling said ambient air from said interior of said house into said pet enclosure; and
    c. said air forcing means being structured and arranged for mounting to an interior side of an external wall of said house;

d. wherein said air forcing means comprises an electrically powered fan;
e. wherein said electrically powered fan is housed in a cylindrical housing;
f. wherein said conduit means includes a conduit portion of cylindrical housing; and
g. wherein said cylindrical housing includes
   i. located to an input side of said fan, a substantially square first portion; and
   ii. located to an output side of said fan, a substantially round-cylindrical second portion comprising said conduit portion.

13. A system for transferring ambient air from a house to an external pet enclosure according to claim 12, wherein said conduit means between said round-cylindrical second portion and said pet enclosure comprises a round cylindrical duct.

14. A system for transferring ambient air from a house to an external pet enclosure according to claim 13, wherein said round cylindrical duct is structured and arranged for mechanical attachment with said pet enclosure.

15. A system for transferring ambient air from a house to an external pet enclosure according to claim 14 wherein at least a portion of said electrically powered fan is structured and arranged for location within said external wall of said house.

16. A system for transferring ambient air from an interior of a house to a pet enclosure external of said house, comprising:
   a. a house having a first external wall;
   b. a pet enclosure having a second external wall;
   c. a housing having an integral fan and attached to said first external wall, said housing comprising
      i. a substantially square first end,
      ii. a substantially round-cylindrical second end, and
      iii. said substantially round-cylindrical second end comprising first external threads;
   d. a duct attachment device for said pet enclosure, having a first attachment end and a second attachment end, said second attachment end comprising second external threads;
   e. a cylindrical duct having a first duct end and a second duct end, wherein
      i. said second duct end is structured and arranged for threaded attachment by first internal threads to said second external threads of said second attachment end, and
      ii. said first duct end is structured and arranged for threaded attachment by second internal threads to said first external threads of said substantially round-cylindrical second end of said housing;
   f. a first flange nut, having third internal threads for engagement with said first external threads;
   g. a first sealing gasket located between said first flange nut and said first external wall;
   h. a second flange nut, having fourth internal threads for engagement with said second external threads; and
   i. a second sealing gasket located between said second flange nut and said second external wall.

17. A system for transferring ambient air from a house to an external pet enclosure according to claim 16, further comprising:
   a. attached within said housing, a closable damping means for limiting air backflow from said pet enclosure to said house;
   b. attached to said second external wall, a protective means for limiting access to said cylindrical duct from said pet enclosure;
   c. attached to said substantially square first end of said housing, a substantially square fan cover; and
   d. a cap, having fifth internal threads for engagement with said first external threads, for sealing said substantially round-cylindrical second end when said pet enclosure is not in use.

18. A system for transferring ambient air from an interior of a house to a pet enclosure external of said house, comprising:
   a. a house having an external wall;
   b. an air forcing means for forcing ambient air from said interior of said house into said pet enclosure;
   c. a conduit means for channeling said ambient air from said interior of said house into said pet enclosure; and
   d. said air forcing means being mounted to an interior side of said external wall of said house;
   e. wherein said air forcing means comprises an electrically powered fan;
   f. wherein said electrically powered fan is housed in a cylindrical housing;
   g. wherein said conduit means includes a conduit portion of said cylindrical housing; and
   h. wherein said cylindrical housing includes
      i. located to an input side of said fan, a substantially square first portion; and
      ii. located to an output side of said fan, a substantially round-cylindrical second portion comprising said conduit portion.

19. A system for transferring ambient air from a house to an external pet enclosure according to claim 18, wherein said conduit means between said round-cylindrical second portion and said pet enclosure comprises a round cylindrical duct.

20. A system for transferring ambient air from a house to an external pet enclosure according to claim 19, wherein said round cylindrical duct is structured and arranged for mechanical attachment with said pet enclosure.

21. A system for transferring ambient air from a house to an external pet enclosure according to claim 20 wherein at least a portion of said electrically powered fan is located within said external wall of said house.

* * * * *